US012638686B2

(12) United States Patent
Bhatti et al.

(10) Patent No.: US 12,638,686 B2
(45) Date of Patent: May 26, 2026

(54) HARDWARE AND HOUSING SETUP FOR WEARABLE AUGMENTED REALITY APPARATUS

(71) Applicant: Peloton Interactive, Inc., New York, NY (US)

(72) Inventors: AbdurRahman Bin Shahzad Bhatti, Clyde Hill, WA (US); Jensen Rarig Steven Turner, Everett, WA (US)

(73) Assignee: Peloton Interactive, Inc., New York, NY (US)

(*) Notice: Subject to any disclaimer, the term of this patent is extended or adjusted under 35 U.S.C. 154(b) by 95 days.

(21) Appl. No.: 18/486,755

(22) Filed: Oct. 13, 2023

(65) Prior Publication Data

US 2024/0151981 A1     May 9, 2024

Related U.S. Application Data

(60) Provisional application No. 63/415,814, filed on Oct. 13, 2022.

(51) Int. Cl.
G02B 27/01 (2006.01)
G09G 3/3208 (2016.01)

(52) U.S. Cl.
CPC ..... G02B 27/0176 (2013.01); G02B 27/0172 (2013.01); *G02B 2027/0158* (2013.01); *G02B 2027/0161* (2013.01); *G02B 2027/0178* (2013.01); *G09G 3/3208* (2013.01); *G09G 2320/0626* (2013.01); *G09G 2360/144* (2013.01)

(58) Field of Classification Search
CPC ...... G06F 1/163; G06F 1/1681; G06F 1/1683;

G02B 2027/0158; G02B 2027/0161; G02B 2027/0178; G02B 27/0006; G02B 27/0172; G02B 27/0176; G09G 2320/0626; G09G 2360/144; G09G 3/3208

See application file for complete search history.

(56) References Cited

U.S. PATENT DOCUMENTS

| | | | | |
|---|---|---|---|---|
| 2003/0182713 | A1* | 10/2003 | Rolla | H04R 1/1066 |
| | | | | 2/209 |
| 2014/0266877 | A1* | 9/2014 | McClure | G01S 19/072 |
| | | | | 342/357.44 |
| 2015/0009468 | A1* | 1/2015 | Gilligan | G02C 5/006 |
| | | | | 351/63 |
| 2017/0031181 | A1* | 2/2017 | Blum | G02C 7/101 |
| 2017/0115690 | A1* | 4/2017 | Liu | G02B 27/0172 |
| 2018/0095299 | A1 | 4/2018 | Cazalet et al. | |

(Continued)

FOREIGN PATENT DOCUMENTS

CN          216646960 U          5/2022

*Primary Examiner* — Kenneth Bukowski
(74) *Attorney, Agent, or Firm* — Volpe Koenig

(57) ABSTRACT

Described herein are embodiments of apparatuses for an augmented reality system wherein a wearable augmented reality apparatus may be constructed to have multiple chambers with circuitry elements that are physically and electrically connected. The embodiments may further include a structure for a circuitry chamber that protects sensitive components from external factors. The embodiments may further include arrangements for subsections and components in a wearable augmented reality apparatus that allow for an overall compliant housing while reducing potential shearing force on embedded components.

19 Claims, 13 Drawing Sheets

800
802
804
808
806

(56)  References Cited

U.S. PATENT DOCUMENTS

| | | | | | |
|---|---|---|---|---|---|
| 2018/0299683 | A1* | 10/2018 | Ohashi | ................ | H04N 13/398 |
| 2021/0335235 | A1* | 10/2021 | Yang | .................... | G09G 3/3233 |
| 2023/0011656 | A1* | 1/2023 | Huang | ................... | G02B 6/005 |
| 2023/0096634 | A1* | 3/2023 | Shih | ......................... | H01Q 1/42 |
| | | | | | 343/700 R |
| 2023/0299470 | A1* | 9/2023 | Jenkins | ................ | B29C 64/112 |
| | | | | | 343/718 |

* cited by examiner

HARDWARE AND HOUSING SETUP FOR WEARABLE AUGMENTED REALITY APPARATUS

CROSS-REFERENCE TO RELATED APPLICATIONS

This application claims the benefit of U.S. Provisional Application No. 63/415,814 filed Oct. 13, 2022 the contents of which are incorporated herein by reference.

BACKGROUND

Building a wearable augmented reality headset may require integrating rigid circuitry into a headset that can be worn on multiple heads and properly stays on a user's head while they are in motion. This may require the overall headset to a have a degree of flexibility/compliance such that it can conform to a user's head. To do this and function as an augmented reality headset, the headset may contain a sequence of connected rigid and compliant components. Furthermore, being able to pass increasing amounts of data between hardware chambers may require components embedded in one another that will not break or fracture during use of the headset

SUMMARY

Described herein are embodiments of methods and apparatuses for an augmented reality system. Some embodiments may include a wearable augmented reality apparatus that may include multiple chambers that contain electrical components, at least one of which chambers may include a processor operationally coupled to a sensor system and a Bluetooth unit. Some embodiments of the sensor system may include an inertial measurement unit (IMU) sensor and a global navigation satellite system (GNSS) unit. Some embodiments of the Bluetooth unit may include a Bluetooth transceiver and Bluetooth antenna configured to communicate with external devices. Some embodiments of the wearable augmented reality apparatus may further include a display driver operationally coupled to the processor which may be configured to modify the image on a display and produce at least one virtual object superimposed on a field of vision of a user of the wearable augmented reality apparatus.

In some embodiments, chambers containing electrical components may be connected by interconnects which may transfer data and power between chambers. In some embodiments, interconnects may include cables, which may include flex cables and/or coaxial cables. In some embodiments, interconnects between chambers may run through a nose piece. Some embodiments of the nose piece may include a living hinge and/or a sensor unit. Some embodiments of the nose piece may further be constructed to allow the nose piece to easily flex but geometrically not flex too far inward.

In some embodiments, the housing of the wearable augmented reality apparatus may be constructed out of alternating rigid and compliant sections, which may allow circuitry chambers to be housed in rigid sections while the overall housing is compliant and conforms to various user head curvatures. In some embodiments, a compliant component may be embedded in the housing of the wearable augmented reality apparatus. Some embodiments of the embedded component may be folded in a certain way and/or be constructed to make contact with certain parts of the housing to avoid damage to the embedded component during use of the wearable augmented reality apparatus.

In some embodiments, the housing for at least one of the chambers of the wearable augmented reality apparatus may be constructed to protect internal sensitive components from external factors. Some embodiments of the protected chamber may allow for external ports, tactile interfaces, and external optical aperture elements.

BRIEF DESCRIPTION OF THE DRAWINGS

A more detailed understanding can be had from the following description, given by way of example in conjunction with the accompanying drawings wherein:

FIG. 10 is a block diagram of another example system depicting a wearable augmented reality apparatus in accordance with some embodiments.

DETAILED DESCRIPTION

Figure 1A:
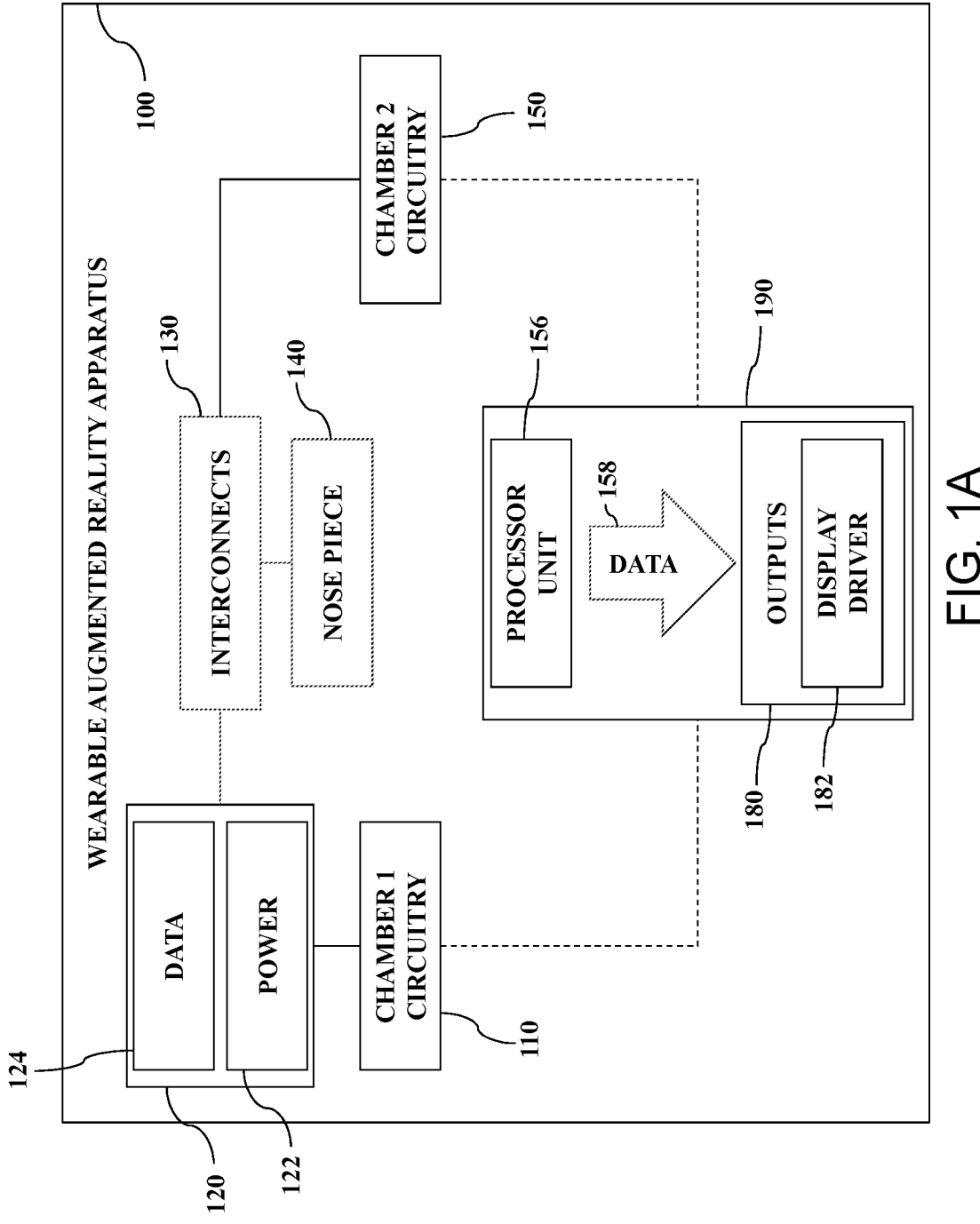
FIG. 1A is a block diagram of an example system depicting a wearable augmented reality apparatus in accordance with some embodiments.

Although features, techniques, approaches, examples, cases, situations, and elements are described above in particular combinations, one of ordinary skill in the art will appreciate that each of these features, techniques, approaches, examples, cases, situations, and elements may be used alone or in any combination with the other features, techniques, approaches, examples, cases, situations, and elements.

In addition, the methods described herein may be implemented in a computer program, software, or firmware incorporated in a non-transitory computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

A wearable augmented reality apparatus differs from a pair of regular glasses in that it contains a significant amount of circuitry that may be contained within the exterior housing. This circuitry may be distributed throughout multiple chambers in the wearable augmented reality apparatus to allow for symmetry and to maximize space efficiency. These chambers may be rigid in nature and constructed to protect internal sensitive components and circuitry from external factors.

Several existing solutions do not allow for the overall housing to be compliant and conform to the various curvatures of different users' heads. Furthermore, existing solutions that are compliant may allow components to be embedded within the housing in a way that protects them and remains robust as the apparatus is used.

Disclosed herein are embodiments of a wearable augmented reality apparatus wherein the apparatus may contain multiple circuitry chambers and elements distributed throughout the apparatus housing, which, in some embodiments, may be overall compliant.

Circuitry in the apparatus may be connected via interconnects embedded in the housing, which, in some embodiments, may be set up in such a way that the interconnects may flex with the rest of the housing with minimal chance of tear or damage.

In accordance with some embodiments, the housing may also be constructed to protect sensitive internal components from external factors while still allowing these components to interface with and serve necessary functions in the wearable augmented reality apparatus.

As used herein, the term user may reference a user of wearable augmented reality apparatus 100 unless otherwise specified.

As used herein, the term chamber may reference an enclosed space in which physical elements may be contained.

As used herein, the term housing may reference a physical casing that contains elements in wearable augmented reality apparatus 100.

As used herein, the term GPS may reference any global navigation satellite system (GNSS), which may refer to data that may include an estimate of the geographic position from one or more constellations of satellites. In accordance with some embodiments, a GPS unit may be operationally linked to the global positioning system (GPS) satellite constellation. In accordance with other embodiments, a GPS unit may be GLONASS, Galileo, and/or BDS unit, receiving information from at least one or more constellations of satellites.

As used herein, the term inertial measurement unit (IMU) sensor may reference a sensor that measures and reports a body's specific force, angular rate, and/or the orientation of the body, using a combination of accelerometers, gyroscopes, and/or magnetometers.

As used herein, the term circuitry refers to a set of operationally connected electronic components.

As used herein, the term compliant may refer to a characteristic of a component to be meaningfully flexible when subjected to applied force.

As used herein, the term rigid may refer to a characteristic of a component to not be meaningfully flexible when subjected to applied force.

As used herein, the term anisotropic may refer to a characteristic of a component to have different physical characteristics when that characteristic is measured along different axes.

As used herein, the term living hinge may refer to a thin compliant hinge that resists being bent along a particular axis and connects two rigid pieces of materials.

As used herein, the term shearing force may refer to a set of forces that are unaligned forces pushing one part of a body in one specific direction, and another part of the body in an opposing direction.

As used herein, the term nose piece may refer to the portion of the housing that rests on the nose of a user of wearable augmented reality apparatus 100.

As used herein, the term Bluetooth may refer to any method of short-range wireless interconnection of and communication between electronic devices.

As used herein, the term ribbon cable may refer to a cable capable of transmitting electronic signals consisting of several insulated wires connected together to form a flat ribbon.

As used herein, the term flex cable may refer to a single electrical cable or set of electrical cables designed to cope with the tight bending radii and physical stress.

As used herein, the term real-time kinematic (RTK) unit may refer to an electrical unit that corrects for error in GPS readings and uses a known locational reference point.

FIG. 1A is a block diagram of wearable augmented reality apparatus that may include a housing made of plastic or another material, which may include at least two chambers containing circuitry, chamber 1 circuitry 110 and chamber 2 circuitry 150, which may be respectively located against the temples of the head of a user. Wearable augmented reality apparatus 100 may include collection of components 190, which may be wholly contained in chamber 1 circuitry 110 or chamber 2 circuitry 150 in accordance with some embodiments. In accordance with other embodiments, components in collection 190 may be distributed between chamber 1 circuitry 110 and chamber 2 circuitry 150.

Collection of components 190 may include processor unit 156, which may drive the operation of circuitry in wearable augmented reality apparatus 100. In accordance with some embodiments, processor unit 156 may send data 158 to outputs 180. Based on what data 158 comprises, the output of elements in outputs 180 may change. In accordance with some embodiments, data 158 may include information that may at least in part affect visually perceived behavior of at least one of the holographic objects generated by wearable augmented reality apparatus 100.

In accordance with some embodiments, chamber 1 circuitry 110 and chamber 2 circuitry 150 may be operationally and/or physically connected by interconnects 130. In accordance with some embodiments, interconnects 130 may run through nose piece 140 and may transfer elements 120 between chamber 1 circuitry 110 and chamber 2 circuitry 150. In accordance with some embodiments, elements 120 may include data 124 and power 122, and interconnects 130 may transfer elements 120 unidirectionally or multi-directionally.

Figure 1B:
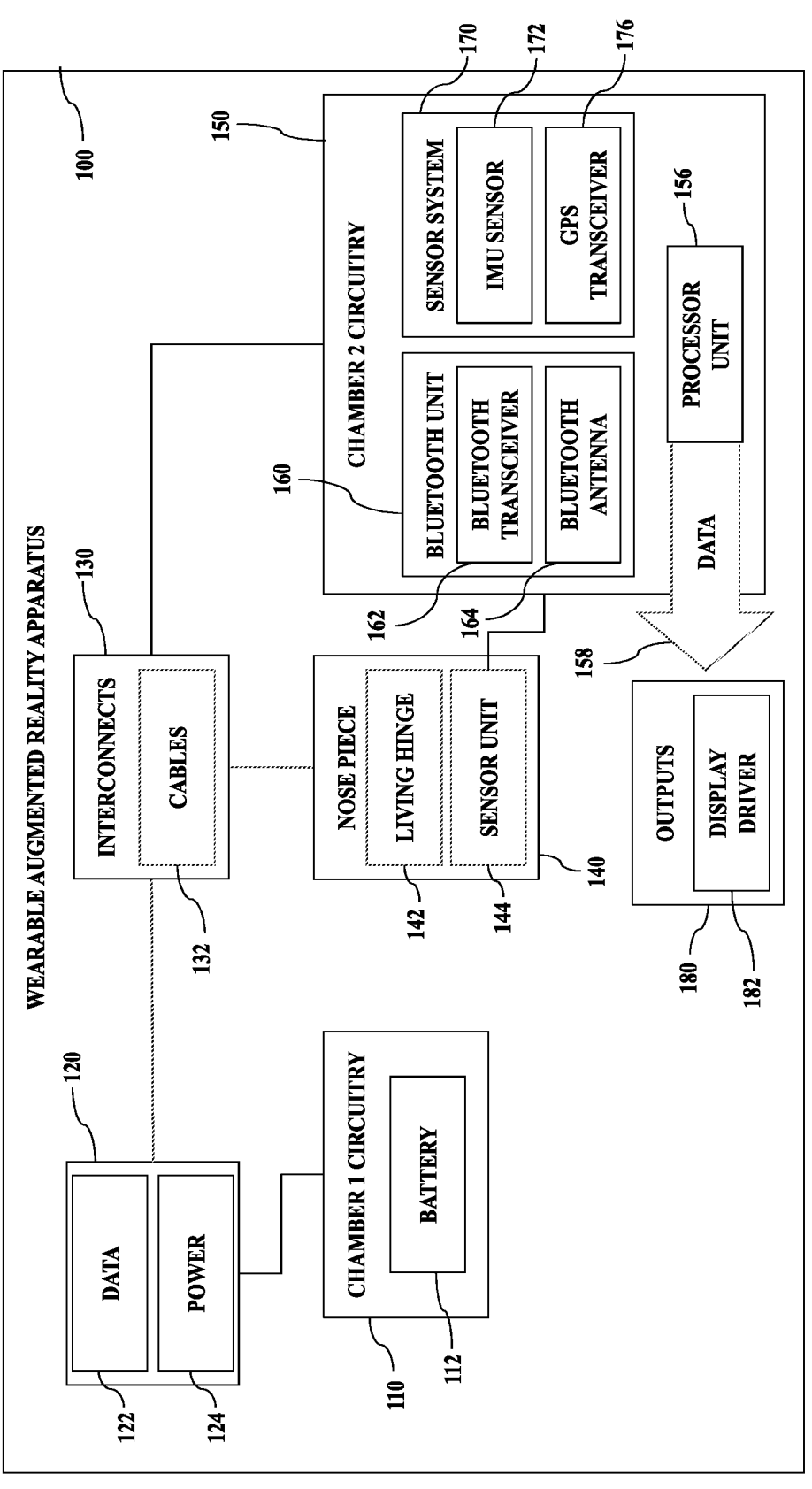
FIG. 1B is a block diagram of another example system depicting a wearable augmented reality apparatus in accordance with some embodiments.

FIG. 1B is a block diagram of an example of how wearable augmented reality apparatus 100 may be configured in accordance with some embodiments. In accordance with some embodiments, chamber 1 circuitry 110 may include battery 112, which may provide electrical power to wearable augmented reality apparatus 100. In accordance with various embodiments, battery 112 may be a lithium-ion battery and it may be rechargeable and/or replaceable. In accordance with some embodiments, chamber 1 circuitry 110 may include more than one battery cell, as multiple smaller cells might conform better to the shape of a chamber in accordance with some embodiments. In accordance with some embodiments, there may be multiple batteries in wearable augmented reality apparatus 100, not just in chamber 1 circuitry 110, but also in chamber 2 circuitry 150 or in other parts of the housing of wearable augmented reality apparatus 100.

In accordance with some embodiments, battery 112 may deliver power 124 to chamber 2 circuitry 150 and/or other elements in wearable augmented reality apparatus 100 that may require electrical power, such as sensor unit 144 or outputs 180. Data to turn on and off and otherwise manipulate the power output and voltage of battery 112 may be included in data 122 in accordance with some embodiments.

In accordance with some embodiments, elements 120 may be transferred throughout wearable augmented reality apparatus 100 via interconnects 130 which may include cables 132. In accordance with some embodiments, cables 132 may denote a single cable with multiple insulated conductive strands or wires, or, in accordance with some other embodiments, multiple self-contained cables. In accordance with some embodiments, cables 132 may pass through nose piece 140, which may include living hinge 142 in accordance with some embodiments. In some embodiments, living hinge 142 may be in the center of the user's face/wearable augmented reality apparatus 100 and configured such that the housing of wearable augmented reality apparatus 100 better grasps the head of its user.

In accordance with some embodiments, nose piece 140 may include sensor unit 144, which may be powered by cables 132 and may include an IMU sensor that may be suited to be in the center of the head and/or a GPS unit or antenna that may need to be placed away from other circuitry elements or otherwise configured to avoid interference. In accordance with some embodiments, sensor unit 144 may include an ambient light sensor because the center of the eyes may provide a reasonably accurate reading for how bright a user will perceive the environment.

If there is an ambient light sensor in sensor unit 144, data from that sensor may modify data 158, which may impact the brightness of a display that display driver 182 controls in accordance with some embodiments. Sensor unit 144 may be operationally coupled to and controlled by some elements in chamber 2 circuitry 150 in accordance with some embodiments. Sensor unit 144 may further impact data 122 and affect information in data 122 and output of processor unit 156.

In accordance with some embodiments, chamber 2 circuitry 150 may include Bluetooth unit 160, which may include Bluetooth transceiver 162 and a Bluetooth antenna 164, which will allow wearable augmented reality apparatus 100 to communicate with external devices. Bluetooth unit 160 may be configured to connect to smart devices, such as a smartphone or a smartwatch, which may allow a user to control the functions of wearable augmented reality apparatus 100.

In accordance with some embodiments, elements in the Bluetooth unit 160 may also be used to connect with and/or control peripherals that might have functions relevant to the wearable augmented reality apparatus 100 experience, such as Bluetooth-connected headphones, an RTK unit, or external LED's in accordance with various embodiments. Data received by Bluetooth unit 160 from external devices may impact the output of the Bluetooth unit 160 and data 158, which may impact what is displayed by a display controlled by display driver 182 and/or the output of any other elements that may be included in outputs 180 in accordance with various embodiments.

Chamber 2 circuitry 150 may include sensor system 170, which may include IMU sensor 172 and GPS transceiver 176. In accordance with some embodiments, IMU sensor 172 and GPS transceiver 176 may at least in part be used to determine the attitude (the orientation and position) of wearable augmented reality apparatus 100 and attitude of a user. Both sensor system 170 and Bluetooth unit 160 may be operationally connected to processor unit 156 in accordance with some embodiments, and processor unit 156 may affect how and what data and power are delivered to sensor system 170 and Bluetooth unit 160.

In accordance with some embodiments, processor unit 156 may output data 158 based at least in part on the data from Bluetooth unit 160 and sensor system 170, which in turn may affect outputs 180. In accordance with some embodiments, outputs 180 may contain display driver 182, which may include a piece of circuitry that controls the image or feed shown on one or more displays or microdisplays (which may be an LCOS, OLED, or LCD displays in accordance with various embodiments). In accordance with some embodiments, power 124 may power the display driven by display driver 182 and/or the illumination for that display.

Figure 1C:
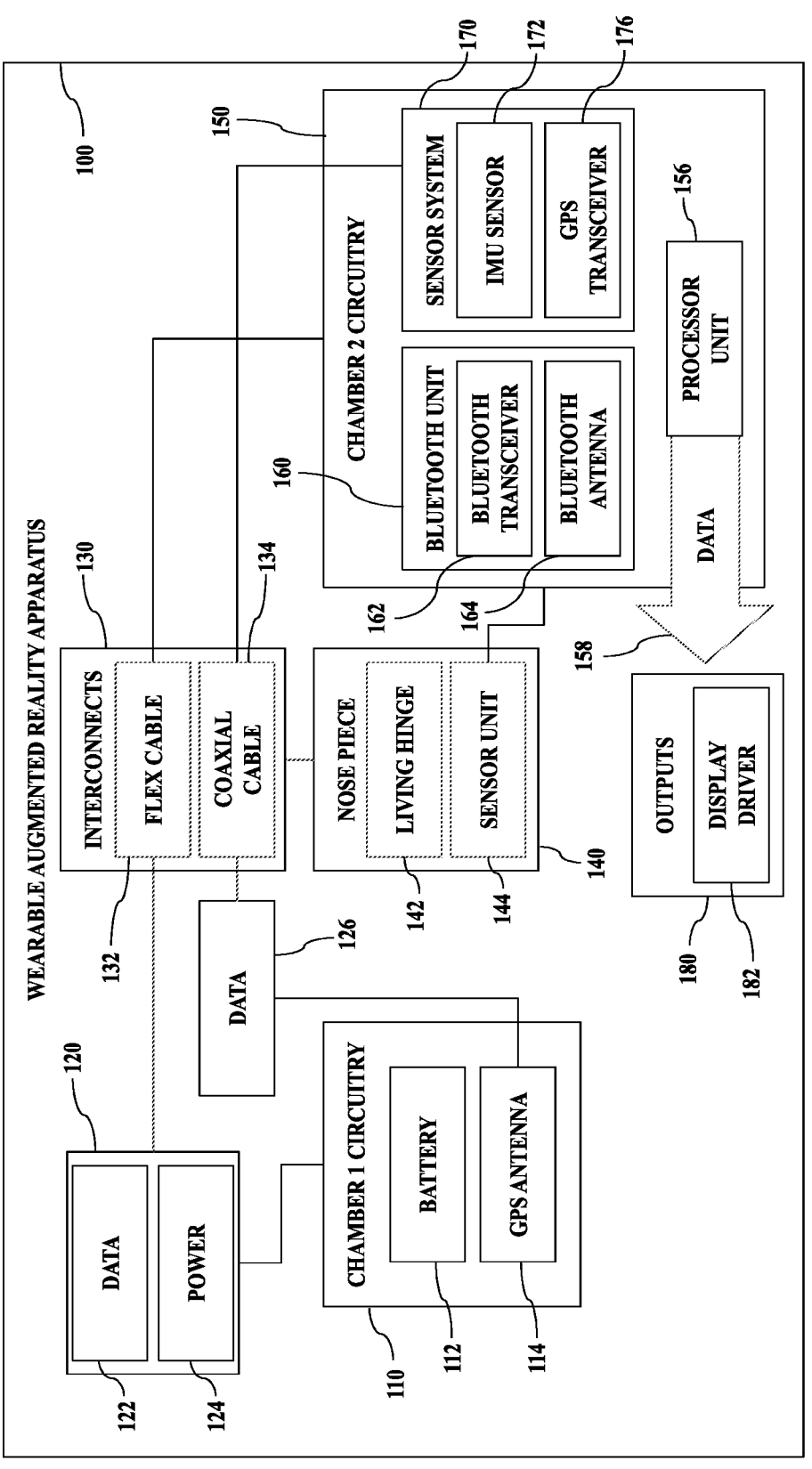

As shown in FIG. 1C, in accordance with some other embodiments, chamber 1 circuitry 110 may contain GPS antenna 114. This may be done so that GPS antenna 114 is sufficiently far removed from interference frequencies that may be given off by processor unit 156. In accordance with some embodiments, GPS antenna 114 may receive GPS information and output GPS data 126, which may be passed to GPS transceiver 176 through coaxial cable 134, which may be included in interconnects 130 and run through nose piece 140.

Additionally, as shown in FIG. 1C, interconnects 130 may include flex cable 132, which may be a flexible ribbon cable in accordance with some embodiments. In accordance with some embodiments, flex cable 132 may be flat with multiple conductive strands and configured to run along the curvature of wearable augmented reality apparatus 100 to connect chamber 1 circuitry 110 and chamber 2 circuitry 150.

Figure 2:
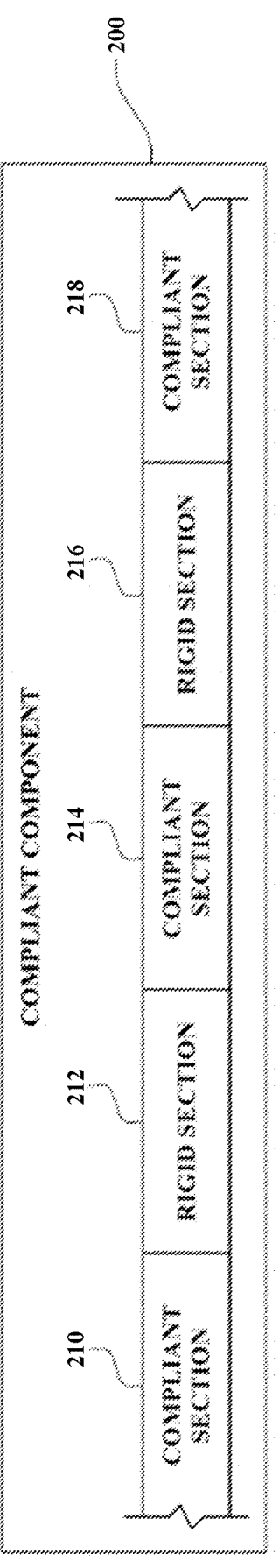
FIG. 2 is a block diagram illustrating an example of the decomposition of a compliant component in accordance with some embodiments.

In order to fit securely onto multiple different head sizes for different users, wearable augmented reality apparatus 100 may be compliant so that it may better conform to different head curvatures. However, some components in wearable augmented reality apparatus 100 may not be compliant, such as the elements in chamber 1 circuitry 110 and chamber 2 circuitry 150 in accordance with some embodiments. Even with rigid sections, however, having the overall housing be compliant may still be possible in accordance with some embodiments, since, as shown in FIG. 2, compliant component 200, may be composed of alternating compliant sections 210, 214, and 218, and rigid sections 212 and 216. The entirety of compliant component 200 may still be feasibly bent to better match a given curvature, but that bending may be concentrated along compliant sections 210, 214, and 218, while sections 212 and 216 may remain straight and not curve.

Figure 3:
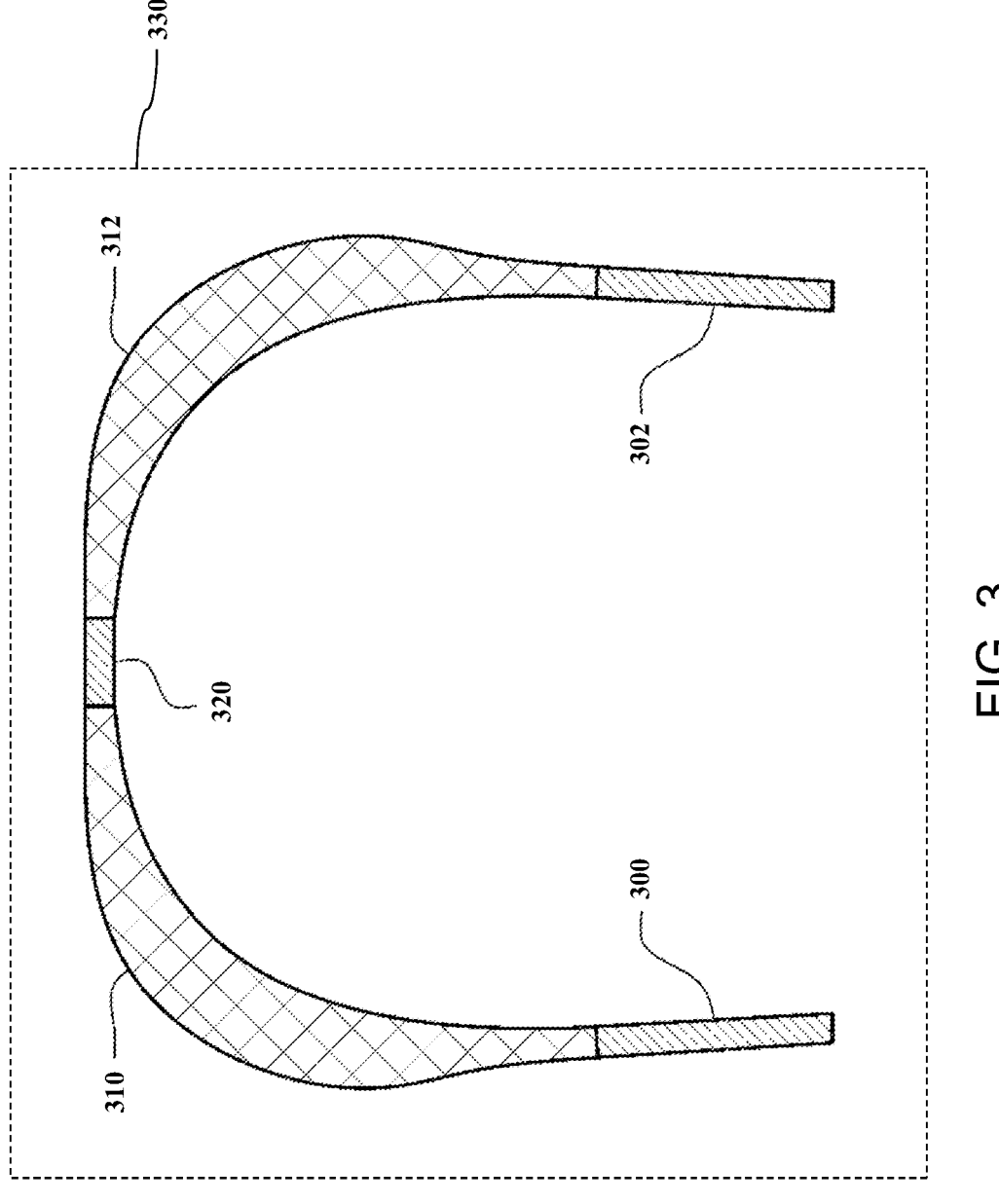
FIG. 3 is a diagram illustrating an example of the rigidity of different parts of a wearable augmented reality headset in accordance with some embodiments.

FIG. 3 shows an example of how wearable augmented reality apparatus housing 330 (which may correspond to housing for wearable augmented reality apparatus 100) may have alternating compliant and rigid components that may be intended to accommodate the shape of a user's head in some embodiments. In FIG. 3, ear pieces 300 and 302 as well as nose piece 320 may be compliant, and chambers 310 and 312 may be rigid. In a relaxed position (i.e. little to no external force is applied to housing 330), ear pieces 300 and 302 may be closer together than when a user puts on apparatus 330.

In accordance with some embodiments, when a user wears wearable augmented reality apparatus housing 330, nose piece 320 may bend and widen the distance between ear pieces 300 and 302. In accordance with some embodiments, ear pieces 300 and 302 may also bend to better match the curvature of the portion of a user's head that ear pieces 300 and 302 make contact with, thereby creating a stronger grip on the head in accordance with some embodiments.

Figure 4:
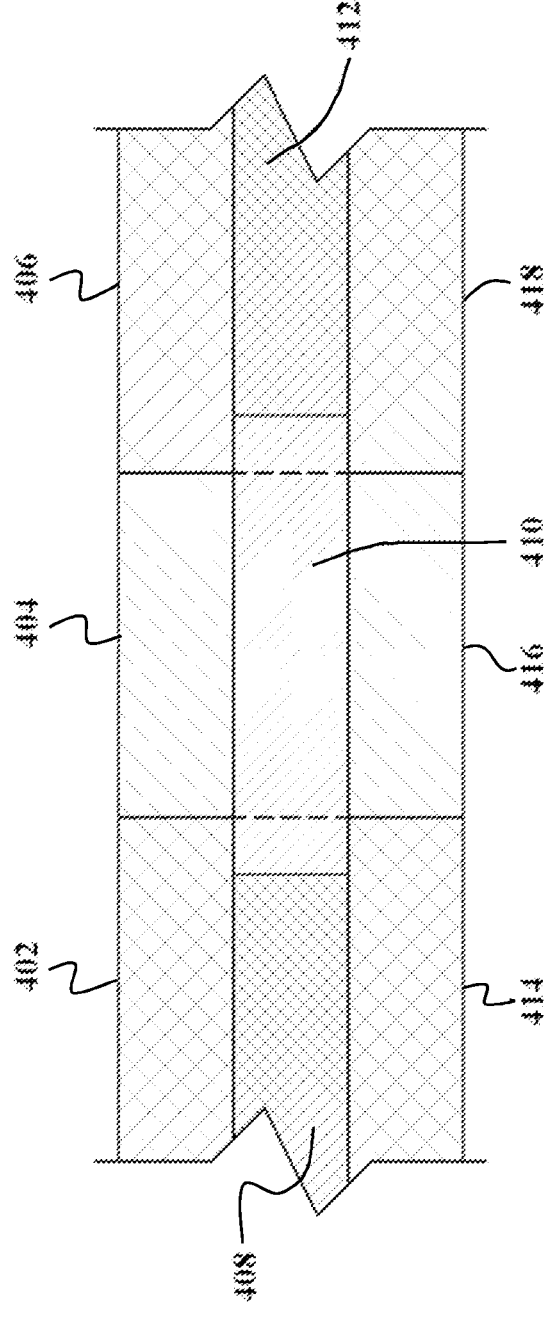
FIG. 4 is a diagram illustrating an example of how a compliant component may be contained within another component with compliant and rigid subsections.

FIG. 4 showcases a cross-section for an abstract example of how a compliant component may be contained within another component with compliant and rigid subsections. An example of how this concept may be applied is interconnects 130 passing through nose piece 140. As shown in FIG. 3, in accordance with some embodiments, nose piece 320, which may correspond to nose piece 140, may be a compliant component that is at least partially flexible. However, in accordance with some embodiments, the material used to make nose piece 140 may still have rigid subsections, and any compliant interconnects that pass through nose piece 140 may be structured in a certain way to avoid damage while maintaining compliance.

In FIG. 4, the compliant component composed of sections 408, 410, and 412 (wherein sections 408 and 412 are rigid, and section 410 is compliant) is embedded within another compliant component with rigid sections 402, 406, 414, and 418, and compliant sections 404 and 416. While not shown in the cross-sectional view, in accordance with some embodiments, sections 402 and 414, sections 404 and 416, and sections 406 and 418 may be physically connected.

As shown in FIG. 4, the alternating subsections in the embedded compliant component should make contact with the alternating subsections in the surrounding compliant component such that rigid subsection 408 makes contact with rigid subsections 402 and 414, compliant subsection 410 makes contact with compliant subsections 404 and 416, and rigid subsection 412 makes contact with rigid subsections 406 and 418. This may be done so compliant sections 404, 410, and 416 can have similar curvatures when the surrounding and embedded components are bent to accommodate the shape of the head of a user.

In order to avoid the embedded compliant component breaking along the connections between compliant subsection 410 and rigid subsections 408 and 412, as shown in FIG. 4, the length of compliant subsection 410 may be long enough such that it makes contact with the entire length of subsections 404 and 416 as well as at least a portion of adjacent rigid sections 402, 406, 414, and 418.

Figure 5A:
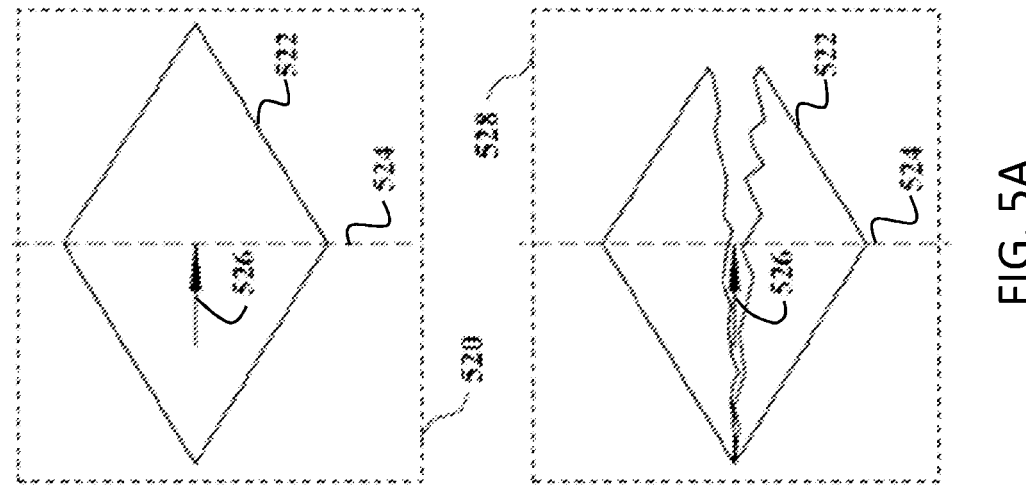
FIG. 5A is a diagram illustrating how a flat compliant component may be bent along an axis.
Figure 5B:
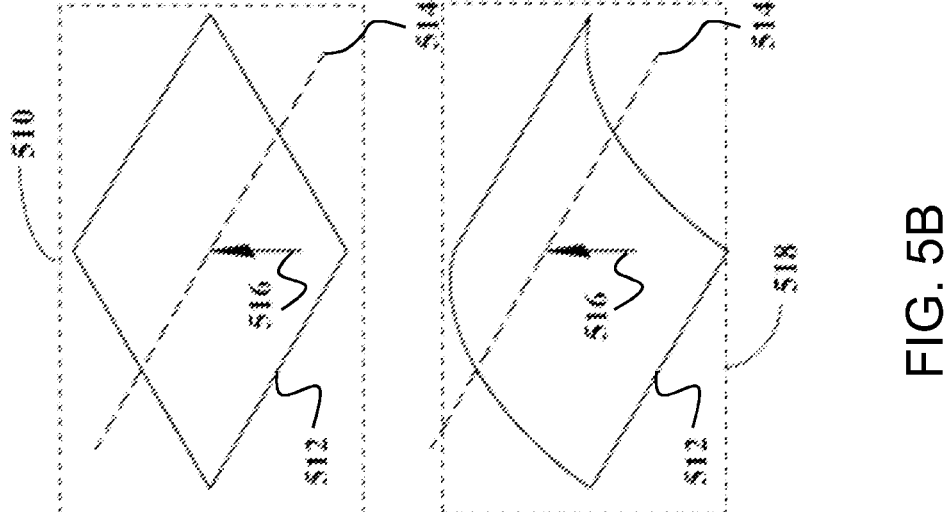
FIG. 5B is a diagram illustrating how a flat compliant component may be bent along another axis.
Figure 5C:
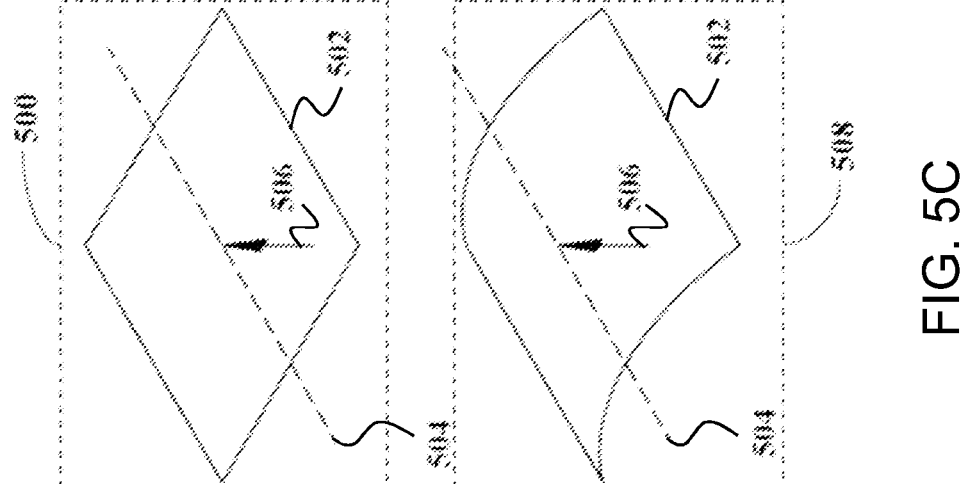
FIG. 5C is a diagram illustrating how a flat compliant component may be bent along another axis.

FIGS. 5A, 5B, and 5C illustrate how a flat compliant component may be anisotropic and may react differently to being bent along different axes. In FIG. 5A, flat compliant component 502 may be taken from relaxed position 500 to bent position 508 if force 506 is applied and flat compliant component 502 bends about x-axis 504. In FIG. 5B, flat compliant component 512 may be taken from relaxed position 510 to bent position 518 if force 516 is applied and flat compliant component 512 bends along y-axis 514. As shown in FIGS. 5A and 5B, flat compliant components 502 and 516 may remain intact if force is applied approximately perpendicularly to the flat face and may be made to stably bend about an axis parallel to the flat face.

In FIG. 5C, flat compliant component 522 may be taken from relaxed position 520 to position 528 when force 526 is applied in an attempt to bend flat compliant component 522 along z-axis 524, which is perpendicular to the flat face of flat compliant component 522. This may apply a shearing force on flat compliant component 522, and may cause flat compliant component 522 to tear as shown in FIG. 5C depending on the magnitude of shearing strain.

Figure 6:
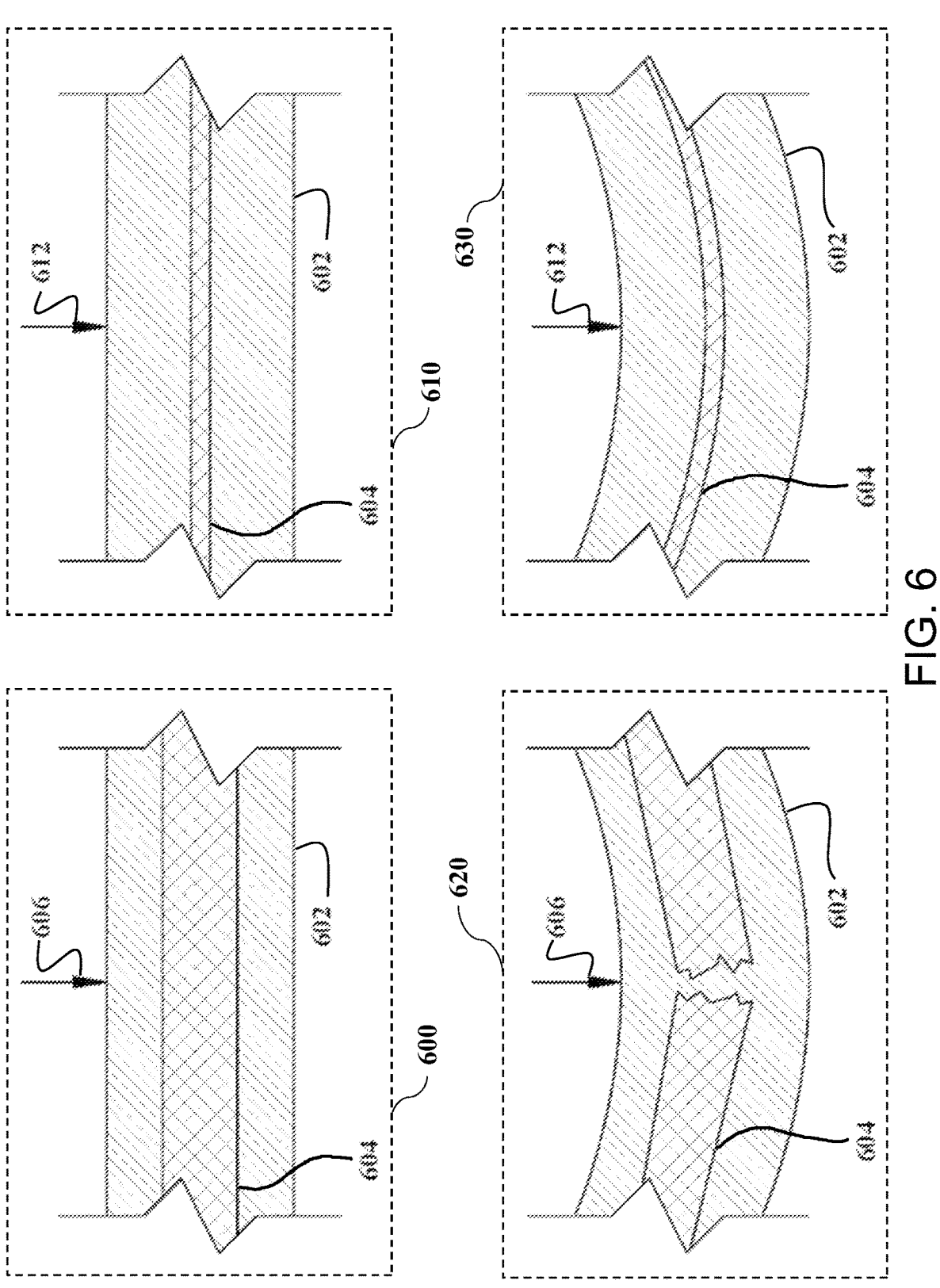
FIG. 6 is a set of diagrams illustrating how a flat compliant component may be bent along different axes.

FIG. 6 illustrates an example of the phenomenon in FIGS. 5A, 5B, and 5C. FIG. 6 showcases cross-sectional view 600 that shows a flat compliant component 604 embedded in compliant component 602. Cross-sectional view 600 is perpendicular to the flat face of flat compliant component 604. Flat compliant component 604 may correspond to interconnects 130 running through compliant nose piece 320 in accordance with some embodiments. FIG. 6 illustrates why component 604 might be at risk of breaking if it runs along the top of nose piece 320. As shown in cross-sectional view 620, if force 606 is applied to components 602 and 604, flat compliant component 604 may experience a shearing force like the one showcased in FIG. 5C, which may tear flat compliant component 604.

As seen in cross-sectional view 610, which may be approximately perpendicular to cross-sectional view 600, if force 612 is applied to components 602 and 604, both components may share approximately the same curvature without flat compliant component 604 experiencing a significant shearing force, as shown in cross-sectional view 630.

Figure 7:
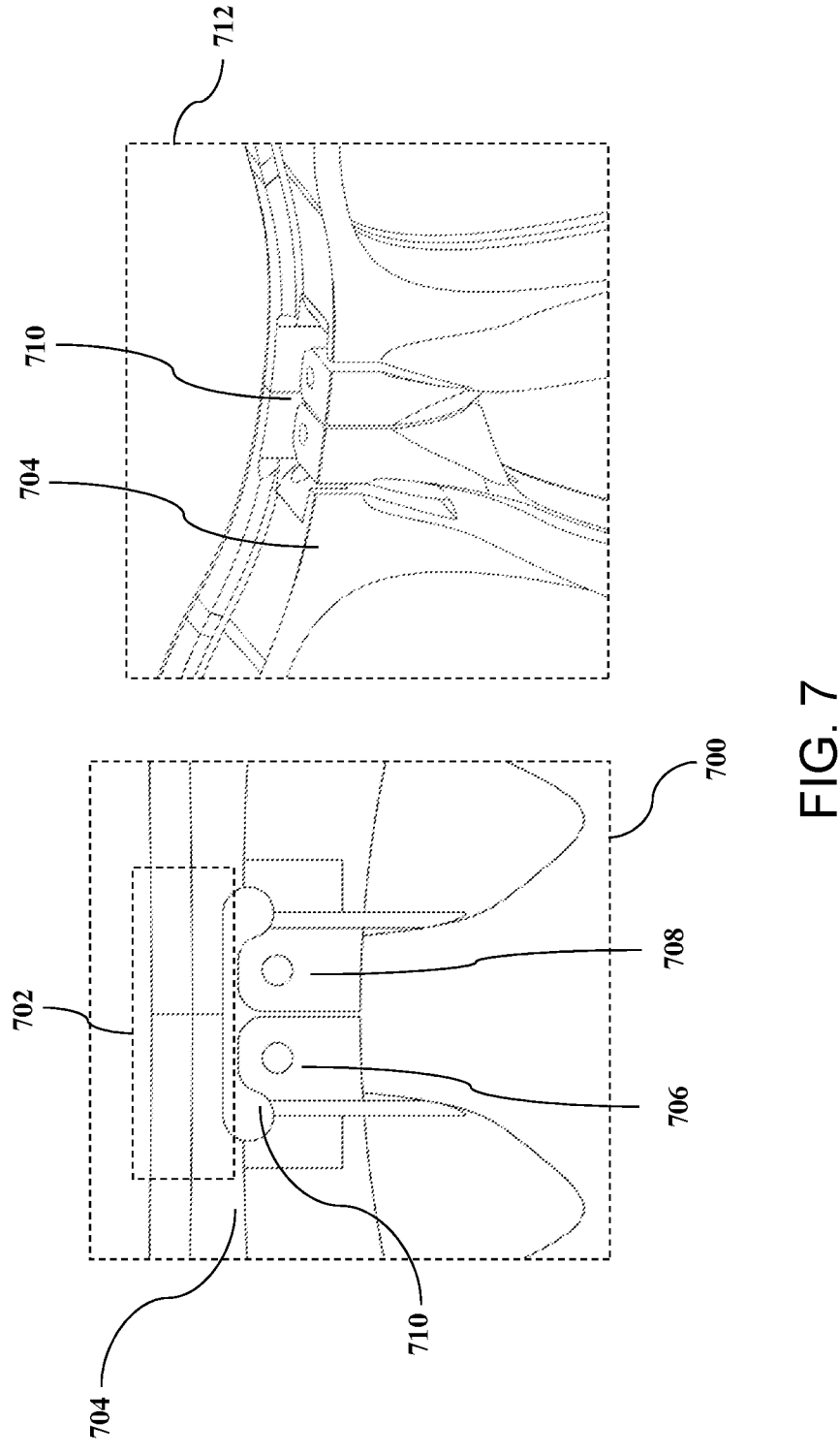
FIG. 7 is a diagram illustrating an example of a living hinge in a wearable augmented reality apparatus.

FIG. 7 shows an example of how nose piece 140 and living hinge 142 may be constructed. As shown in top-view 700 and perspective view 712 of nose piece 704, living hinge 702 may be constructed between the two halves of nose piece 704. In accordance with some embodiments, living hinge 702 may be comprised of the same material as the rest of nose piece 704. In accordance with other embodiments, living hinge 702 may be at least partially comprised of a more flexible material bonded to the rest of the material that composes nose piece 704. In accordance with some embodiments, living hinge 702 may be a compliant component, and the material and thickness of living hinge 702 may affect the resistance the living hinge 702 has to bending and how tightly wearable augmented reality apparatus 100 grasps the face of a user.

In accordance with some embodiments, nose piece 704 may include gap 710, which may be constructed such that its cross-section may be partially curved (as shown in top-view 700) and allow for space between the material sections 706 and 708. In accordance with some embodiments, material section 706 and material section 708 may be physically separated so that the compliance of nose piece is entirely determined by living hinge 702 and its thickness. In accordance with some embodiments, gap 710 may separate material section 706 and material section 708 such that the two material sections may physically crash into another if too great a force is applied to wearable augmented reality apparatus 100 to bend earpieces 300 and 302 towards one another. In accordance with various embodiments, the size of and proximity between material section 706 and material section 708 may be configured to protect the structural integrity of living hinge 702 and any components in nose piece 704 as well as ensure that living hinge 702 is not at significant risk of breaking.

Figure 8:
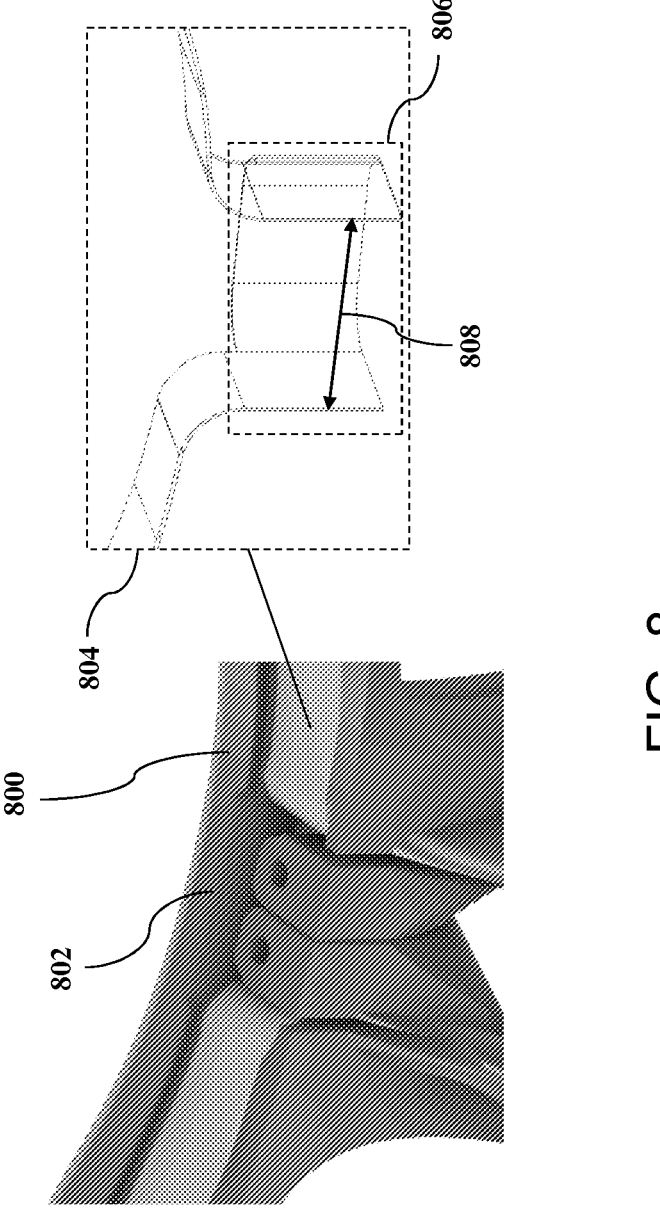
FIG. 8 is a diagram illustrating an example of how a compliant component may be folded while embedded in a wearable augmented reality apparatus.

FIG. 8 shows an example of how flat compliant component 804 may be constructed and folded through nose piece 800. In accordance with some embodiments, flat compliant component 804 may include a ribbon cable and/or a flex cable. As shown in FIG. 8, in accordance with some embodiments, component 804 may run along the top of the outermost edges of nose piece 804, but be folded to run along living hinge 802 (an example of how this may be accomplished is shown by folded section 806). In accordance with some embodiments, the geometry of fold 806 may be helpful in keeping flat compliant component 804 intact and avoiding shearing force effects described in FIG. 5C and FIG. 6. In accordance with some embodiments, distance 808, the horizontal width of folded section 808, may exceed the length of living hinge 802, which may adhere to the stability premise shown in FIG. 4 when embedding one compliant component in another.

Figure 9:
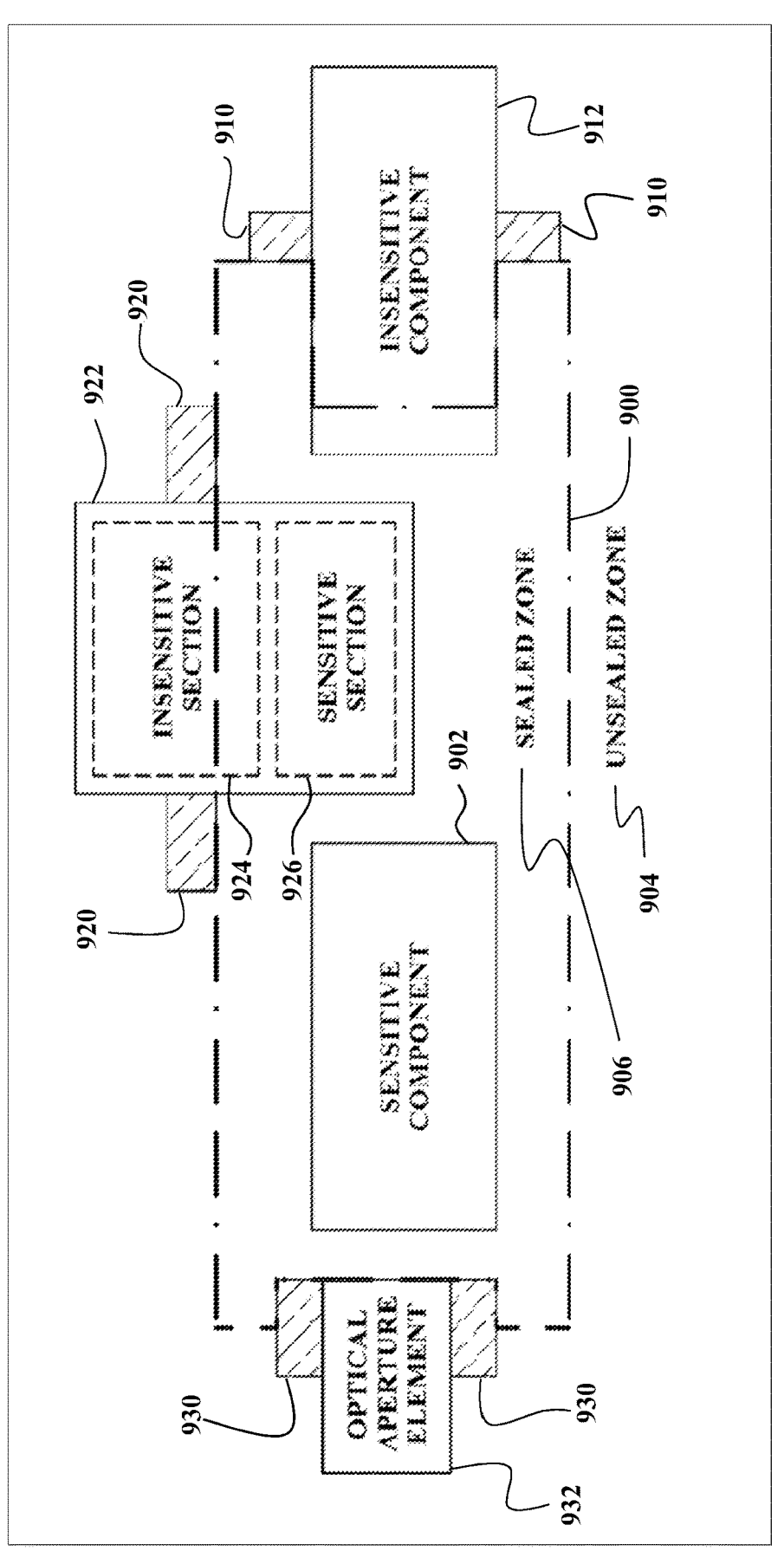
FIG. 9 is a diagram illustrating an example of how a rigid component may seal off sensitive components from external factors.

FIG. 9 illustrates an example of how a rigid component may seal off sensitive components from external factors, such as exposure to water. In FIG. 9, elements contained in sealed zone 906 may correspond to chamber 1 circuitry 110 or chamber 2 circuitry 150 in accordance with some embodiments. In FIG. 9, sealed zone 906 may be separated from unsealed zone 904 by a physical barrier 900, which may be part of a housing and be at least partially made of plastic in accordance with some embodiments.

In accordance with some embodiments, sensitive component 902 may include a circuit board, which may be at risk of malfunctioning if exposed to water. In accordance with some embodiments, sensitive component 902 may connect physically to an external power source at times. In accordance with some embodiments, sensitive component 902 may be physically connected to and/or operationally coupled to insensitive component 912, which may be a USB or power port in accordance with some embodiments. Insensitive component 912 may not be at risk of malfunction if exposed to external factors like water, and may stick out from barrier 900 in accordance with some embodiments. In order to help ensure that sealed zone 906 remains sealed, sealant 910 may be applied on at least some of the contact points between insensitive component 912 and barrier 900. In accordance with some embodiments, sealant 910 (as well as sealant 920 and sealant 930) may be at least partially comprised of silicone.

In accordance with some embodiments, sensitive component 902 may include a display element which may be able to be viewed from outside of sealed zone 906. To accomplish this, optical aperture element 932 may be embedded in barrier 900, in accordance with some embodiments. In accordance with various embodiments, optical aperture element 932 may be transparent or translucent and may be a refractive or reflective element (including a lens, which may be spherical or aspherical, prism, or mirror). In accordance with some embodiments, sealant 930 may be applied at some or all contact points between optical aperture element 932 and barrier 900.

In accordance with some embodiments, sensitive component 902 may operationally respond to tactile input from a source outside of sealed zone 906. In accordance with some embodiments, sensitive component 902 may respond to manipulation of buttons, switches, or touch sensors on the exterior of barrier 900. In accordance with some embodiments, interface 922 may include at least one button and the accompanying circuitry to interpret one or more buttons being pressed. In accordance with some embodiments, insensitive section 924 may comprise a physical raised button and sensitive section 926 may comprise electrical elements configured to interpret when and how long for insensitive section 924 has been pressed down. In accordance with some embodiments, sensitive section 926 may be physically connected to or operationally coupled to sensitive component 902. In accordance with some embodiments, sealant 920 may be applied at some or all contact points between interface 922 and barrier 900.

What is claimed:

1. A wearable augmented reality apparatus comprising:
a housing;
a nose piece including a living hinge that is compliant in bending in a hinge region about a hinge axis transverse to a wearer's line of sight, wherein the nose piece includes first and second rigid material sections separated by a gap on an inner side of the nose piece and joined by the living hinge, the first and second rigid material sections being configured to physically contact each other under excessive bending to limit inward deflection of the nose piece; and
circuitry distributed among multiple chambers within the housing wherein the circuitry includes:
a processor operationally coupled to an inertial measurement unit (IMU), global positioning system (GPS) transceiver, display driver, and Bluetooth unit;
wherein the chambers are electrically connected by an interconnect that includes a cable, wherein the cable includes a flat face, wherein the cable is redirected in the nose piece from a path otherwise substantially following along the chambers, wherein the cable includes a folded shear-relief portion located inside the nose piece, wherein the folded shear-relief portion has a length greater than a width of the hinge region and the cable is oriented such that the cable experiences bending in the hinge region about its flat face and the flat face is substantially free of in-plane shear.

2. The wearable augmented reality apparatus of claim 1, wherein the Bluetooth unit is configured to communicate with a real-time kinematic (RTK) unit.

3. The wearable augmented reality apparatus of claim 1, wherein the housing is composed of alternating rigid and compliant sections.

4. The wearable augmented reality apparatus of claim 3, wherein the housing comprises multiple layers, each layer comprising alternating rigid and compliant sections, wherein at least a portion of a compliant section in a first layer overlaps with a portion of a compliant section in another adjacent layer and a rigid section in the first layer does not overlap with any portion of a rigid section in the adjacent layer.

5. The wearable augmented reality apparatus of claim 4, wherein the nose piece includes the multiple layers.

6. The wearable augmented reality apparatus of claim 1, wherein the cable includes at least one ribbon cable.

7. The wearable augmented reality apparatus of claim 1, wherein at least a portion of the circuitry is sealed within one or more rigid sections.

8. The wearable augmented reality apparatus of claim 1, wherein the cable is folded in the nose piece such that the plane of the flat face of the cable in the nose piece is substantially perpendicular to the plane of the flat face of the cable in the path otherwise substantially following along the chambers.

9. The wearable augmented reality apparatus of claim 1, further comprising a coaxial cable coupled to the GPS transceiver.

10. The wearable augmented reality apparatus of claim 9, further comprising a GPS antenna coupled to the GPS transceiver by the coaxial cable, wherein the GPS antenna is located in a physically separate part of the housing than the GPS transceiver sufficiently far removed from at least one other component of the circuitry to reduce interference from the at least one other component.

11. The wearable augmented reality apparatus of claim 1, wherein the cable is configured to run along the top of some parts of the housing and parallel to the hinge region.

12. The wearable augmented reality apparatus of claim 1, wherein at least one of the multiple chambers includes a transparent optical aperture element as part of the chamber exterior.

13. The wearable augmented reality apparatus of claim 12, wherein the transparent optical aperture element is a prism.

14. The wearable augmented reality apparatus of claim 12, wherein the transparent optical aperture element is a lens.

15. The wearable augmented reality apparatus of claim 14, wherein the lens is an aspherical lens.

16. The wearable augmented reality apparatus of claim 12, wherein the transparent optical aperture element is a planar section of material.

17. The wearable augmented reality apparatus of claim 1, wherein an IMU sensor is located on the nose piece.

18. The wearable augmented reality apparatus of claim 1, wherein the display driver controls an OLED microdisplay.

19. The wearable augmented reality apparatus of claim 18, wherein an ambient light sensor is located on the nose piece, and wherein the display driver adjusts a brightness of the OLED microdisplay based on data from the ambient light sensor.

* * * * *